United States Patent
Rampton et al.

(10) Patent No.: US 7,628,428 B2
(45) Date of Patent: Dec. 8, 2009

(54) METHOD AND APPARATUS FOR PROTECTING CONDUIT SYSTEMS

(76) Inventors: Frank Rampton, 7700 Jackson Rd., Ann Arbor, MI (US) 48103; Charles Kennedy, 7700 Jackson Rd., Ann Arbor, MI (US) 48103; Daniel Zowada, 7700 Jackson Rd., Ann Arbor, MI (US) 48103

( * ) Notice: Subject to any disclaimer, the term of this patent is extended or adjusted under 35 U.S.C. 154(b) by 468 days.

(21) Appl. No.: 11/144,333

(22) Filed: Jun. 3, 2005

(65) Prior Publication Data

US 2006/0012164 A1 Jan. 19, 2006

Related U.S. Application Data

(60) Provisional application No. 60/642,295, filed on Jan. 7, 2005, provisional application No. 60/642,391, filed on Jan. 7, 2005.

(51) Int. Cl.
*F16L 35/00* (2006.01)
(52) U.S. Cl. .............................. 285/45; 285/80; 70/178
(58) Field of Classification Search ................... 285/45, 285/80; 70/178, 232
See application file for complete search history.

(56) References Cited

U.S. PATENT DOCUMENTS

| | | | | |
|---|---|---|---|---|
| 2,016,905 | A * | 10/1935 | Nathan et al. ................. | 285/45 |
| 2,924,546 | A | 2/1960 | Shaw | |
| 3,177,528 | A | 4/1965 | Flower et al. | |
| 3,214,509 | A | 10/1965 | Hugo | |
| 3,367,358 | A * | 2/1968 | Rentschler .................... | 285/45 |
| 3,525,656 | A | 8/1970 | Kennedy, Jr. | |
| 3,625,259 | A | 12/1971 | Kennedy, Jr. | |
| 4,267,699 | A * | 5/1981 | Bahrenburg ................. | 285/45 |
| 4,433,556 | A * | 2/1984 | Brady .......................... | 138/89 |
| 4,442,053 | A | 4/1984 | Pickering et al. | |
| 4,469,469 | A | 9/1984 | Kennedy, Jr. | |
| 4,559,974 | A | 12/1985 | Fawley | |
| 4,630,456 | A * | 12/1986 | Nielsen, Jr. .................. | 70/232 |
| 4,696,324 | A * | 9/1987 | Petronko ...................... | 285/47 |
| 4,756,337 | A | 7/1988 | Settineri | |
| 5,158,114 | A * | 10/1992 | Botsolas ...................... | 138/149 |
| 5,312,137 | A * | 5/1994 | Nee ............................. | 285/45 |
| 5,489,124 | A * | 2/1996 | Nee et al. ...................... | 285/45 |
| 5,540,985 | A | 7/1996 | Kennedy, Jr. | |
| 5,732,743 | A | 3/1998 | Livesay | |
| 5,894,864 | A | 4/1999 | Rich | |
| 6,244,290 | B1 * | 6/2001 | Reicin et al. ................. | 137/312 |
| 6,276,401 | B1 | 8/2001 | Wilson | |
| 6,336,983 | B1 | 1/2002 | Fawley | |
| 2005/0081934 | A1 | 4/2005 | Douglas et al. | |

FOREIGN PATENT DOCUMENTS

FR 2699984 7/1994

OTHER PUBLICATIONS

Royston, Handy Cap™ "Corrosion Protection for Exothermic Grounding Connections".
Excerpt from website www.apsonline.com/bandprotectors.html.
Excerpt from website www.apsonline.com/sprayshields.html.
Excerpt from website www.apsonline.com/radolid.html.
Copending U.S. Appl. No. 11/255,286 filed Oct. 20, 2005.
Copending U.S. Appl. No. 11/420,626 filed May 26, 2006.

* cited by examiner

*Primary Examiner*—David E Bochna
(74) *Attorney, Agent, or Firm*—Dobrusin & Thennisch PC

(57) ABSTRACT

A system and method for protecting underground utility pipes from corrosion or otherwise. The system includes an enclosure having first component and a second component hingedly attached to form a claim-shell like enclosure. The enclosure is adapted to enclose a pipe portion and attached fixture and receive an anti-corrosion agent.

17 Claims, 10 Drawing Sheets

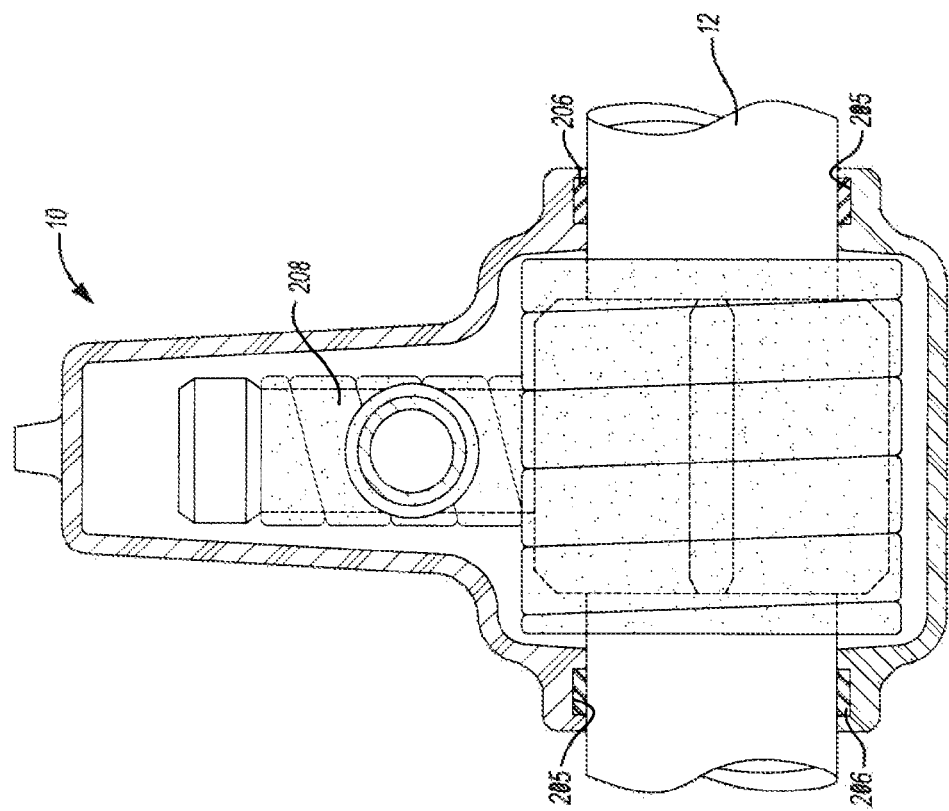
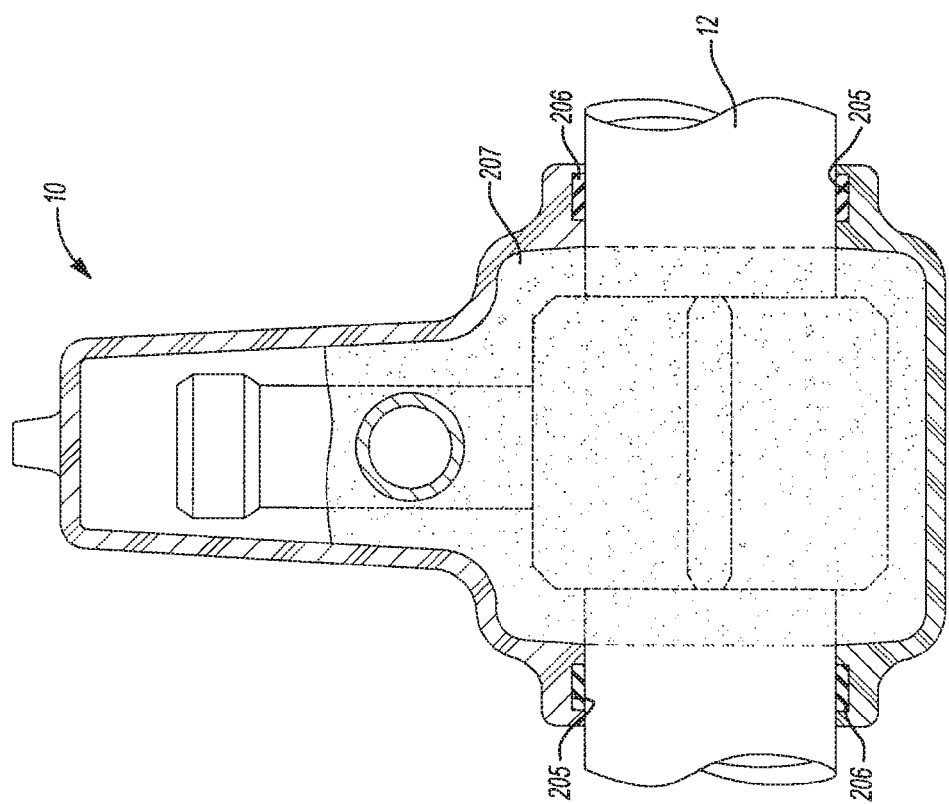

METHOD AND APPARATUS FOR PROTECTING CONDUIT SYSTEMS

CLAIM OF PRIORITY

This application claims the benefit of U.S. Provisional Application Nos. 60/642,295 filed Jan. 7, 2005 and 60/642,391 filed Jan. 7, 2005.

FIELD OF THE INVENTION

The present invention relates generally to the protection of conduit systems such as underground utility systems.

BACKGROUND

Numerous industries utilize conduits for transferring, distribution or protection of materials extending over a distance. While numerous conduits are available, one particularly useful conduit includes pipe portions or the like, which can be linkably attached. Examples of products that may be transferred, distributed or housed within pipe portions include, but are not limited to, fluid materials such as: natural gas, propane, water, petroleum, industrial products, paper making material, chemicals, waste product, nuclear product or byproduct, food product, air and other fluids. However, non-fluid materials may also be advantageously housed within pipe portions such as: electrical wire, cable wire, the like, or otherwise.

In any case, it is desired to provide protection to these pipe portions and any attached fixture thereto from damaging conditions such as shifting earth, corrosive conditions or otherwise. Also, it may also be desired to seal these pipe portions and fixture from surrounding environmental conditions, or alternatively seal low pressure fluid leaks originating from the pipe portions or fixture.

In one exemplary utility field, a natural gas supply network is provided for delivering natural gas to different localities of a service region. From these main gas lines, branches extend to further supply more specific areas (e.g., blocks, subdivisions, business sector or otherwise), which may further branch to feed individual homes, business, or otherwise, with natural gas.

In connecting these homes and/or business to a natural gas supply network, a fixture, such as a valve, may be utilized to control the flow of natural gas. This control is desired during repair or alteration of a gas line, removal or the addition of gas lines, or otherwise. This control is also desired during emergency occurrences such as failure of the natural gas line.

Due to continual required access to pipe portions and fixtures throughout the supply network, utility companies typically excavate large portions of earth in order gain access to these components. This type of excavation results in the formation of ditches, craters, holes or otherwise so as to allow individuals to physically climb down to where the pipe portions and fixtures are located. This type of excavating process requires the use of heavy machinery (e.g., diggers, excavators, etc.) to remove the dirt, concrete or otherwise. Not only is this method time consuming and costly, due in part to the purchase and upkeep of equipment, but it is also inconvenient for surrounding homes and business who must tolerate noise, road conditions and obstacles resulting therefrom.

In response to the above excavation inconveniences, industries have responded with the use of keyhole technology, which has been found to be cost effective. Keyhole technology is the accessing of underground equipment by creating small and substantially vertical holes over pipe portions and fixtures, or otherwise. This typically results in the formation of cylindrical-shaped holes, or otherwise, having substantially vertical walls. Typically, these holes are small wherein a person would not normally be able to access the underground pipes without the use of tools. Examples of keyhole forming tools include drills, hydro cutting/digging tools, siphoning mechanism, the like or otherwise.

Upon completion of work to these pipe portion and/or fixtures, these components may be left with insufficient protection from surrounding environmental conditions (e.g., damage resulting from corrosion, earth shifting or otherwise).

Attempts have been made to protect these pipes by coating the pipe portion and fixture with anti-corrosion agents or wraps. However, the application of these protective measures has proven challenging due to the space constraints within a keyhole.

Given the difficulty in protecting underground pipe portions and fixtures, particularly within a keyhole, there is a need for a protective system, method of protection, and tools for the installation of the same.

SUMMARY OF THE INVENTION

The present invention meets the above needs by providing an enclosure system for conduits and fixtures attached thereto. The system includes a first component having a first mating surface and a second component having a second mating surface. The first and second components are hingedly attached to allow the enclosure to move between an open and closed position. An engagement feature may also be provided for maintaining closure of the first and second components, wherein upon closure a cavity is formed between the first and second components which includes first opening extending through the enclosure for receiving a first conduit having a fixture attached thereto.

The present invention also provides a method of protecting underground pipes from corrosion or otherwise. In one aspect, the method includes providing a first pipe portion, a second pipe portion and a valve connecting the first and second pipe portions. The first and second pipe portions are enclosed with an enclosure comprising a first component having a first mating surface and a second component having a second mating surface. An attachment feature may be provided for hingedly attaching the first and second components together and providing movement of the enclosure between and open and closed position. Optionally, the enclosure may be at least partially filled with an anti-corrosion agent for providing corrosion protection to the enclosed pipe portions and fixture attached thereto.

DESCRIPTION OF THE DRAWINGS

FIG. 12 is a perspective view of a tenth embodiment of the present invention.

FIG. 13 is a perspective view of an eleventh embodiment of the present invention.

DETAILED DESCRIPTION OF THE INVENTION

Figures 1, 2, 3:
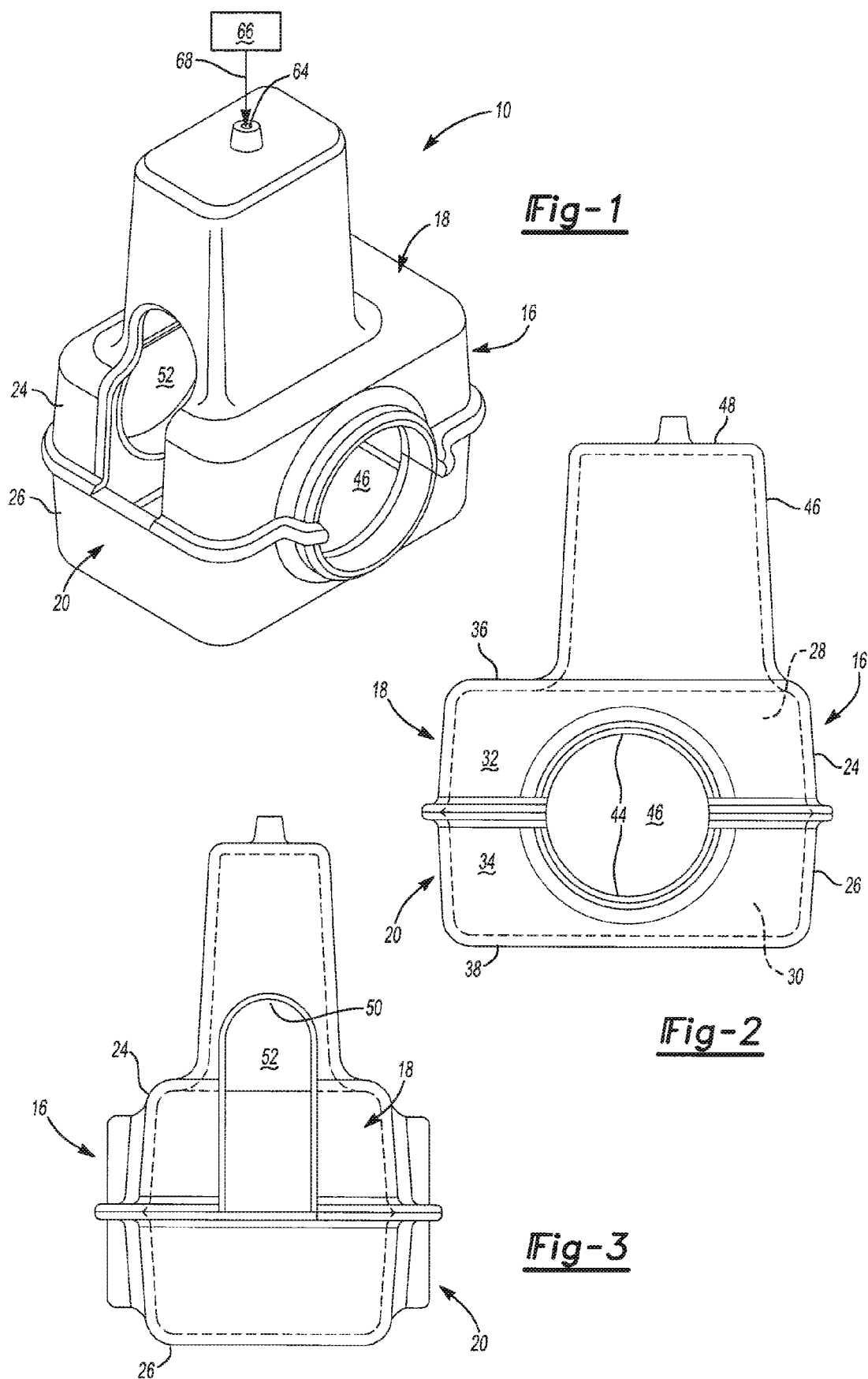
FIG. 1 is a perspective view of a first exemplary embodiment of the present invention.
FIG. 2 is a side elevational view of the first exemplary embodiment illustrated in FIG. 1.
FIG. 3 is another side elevational view of the first exemplary embodiment illustrated in FIG. 1.

The present invention provides an enclosure system and method for protecting underground conduits and fixtures extending therefrom from damages resulting from attempted utility repairs, material corrosion, shifting earth or otherwise. In one aspect, this protection is in the form of an enclosure having a first and second component adapted to enclose one or more (conduits such as pipe portions) and attached fixture (such as a valve). Accordingly, the enclosure is adapted to move from an open position to a closed position as the first and second components are joined together. Preferably, the first and second components are hingedly attached to guide the enclosure between the open and closed position. Advantageously, at least one of the first or second components are configured to receive a valve extending or otherwise attached to one or more pipe portions.

The enclosure is adapted to provide a barrier between the surrounding environment (e.g., earth, moisture, ultraviolet rays or otherwise) and one or more pipe portions and fixture. Preferably, the enclosure provides a cavity between the enclosed pipe portions and fixture and the surrounding environment. Accordingly, in one aspect of the present invention, a protective agent may fill all of a portion of the cavity. Advantageously, this protective agent may include an anti-corrosion agent to provide corrosion protection to the pipe portions and fixture.

In application, the present invention may be used with most conduit systems which may or may not have features or branches extending therefrom. However, an advantageous application is in the in the utility supply sector (e.g., gas, water, telephone, electricity, cable television or otherwise). A still more advantageous application may be in delivery of natural gas to homes, businesses and the like using a network of underground natural gas pipes, wherein a fixture or otherwise is used to connect the homes, businesses to a main gas supply network.

In any of the above applications, or otherwise, the present invention is particularly useful in conjunction with keyholes used for accessing underground pipe portions and fixtures. As previously discussed, keyhole forming comprises the accessing of underground components for modification, repair or otherwise. This includes forming a substantially vertical hole, typically in a ground surface, for accessing the desired pipe portion. For example, a circular hole may be created having a diameter less than about one half meter with substantially vertical walls. Similarly, square or rectangular holes may also be formed having substantially vertical walls. It should be appreciated that typically the hole is minimally sized to minimize disturbance to the surrounding area. This often makes it difficult for a person to enter the keyhole to access these pipe portions without the use of tools. As such, the enclosure of the present invention is adapted to be placed into the above-mentioned keyholes and manipulated to enclose one or more pipe portions and fixtures attached thereto.

Lowering and placement of the enclosure about the pipe portion and fixture may be assisted with the use of keyhole tools as disclosed herein or otherwise. By example, these tools may include clasping components, manipulating components or otherwise, which are suitable for raising, lowering, and manipulating components of the enclosure of depths up to 6 feet or more.

Optionally, before, during or after enclosure of a pipe portion and fixture, any resulting cavity located between pipe portions and fixture and the enclosure may be filled with a protective agent 207 to provide corrosion protection to the enclosed components. Alternatively, or in conjunction therewith, a protective wrap or material 208 may be placed on the pipe portion and/or fixture.

While the following description recites pipe portions and fixtures attached thereto, it should be appreciated that the enclosure of the present invention may be used with other types of conduits and attached features as discussed herein. By example, other fixtures may include valves, joints, fittings, connectors, metering devices, combinations thereof or otherwise.

With reference to the exemplary embodiments shown in FIGS. 1-5, systems 10 of the present invention are shown. In these configurations, the systems are configured for providing protection to a first pipe portion 12, a second pipe portion 12' and a fixture 14 attached thereto. The systems include an enclosure 16 having a first component 18 and a second component 20. Preferably, the first and second components are attached, via an attachment feature, to provide motion relative to each other and matingly join the first and second components together. Accordingly, the first and second components may be hingedly attached, via hinge 22 or otherwise so as to move the enclosure between an open position and a closed position.

The first and second components 18, 20 includes shells 24, 26 having cavities 28, 30 adapted for receiving at least a portion of one or more pipe portions and fixture(s) attached thereto. The shells comprise an exterior surface and an interior surface, both of which end at an outer peripheral portion. Accordingly, upon joining of the first and second components an enclosure cavity is formed which is adapted for providing protection to the enclosed pipe portion and fixture attached thereto.

In the embodiments shown, the shells 24, 26 of the first and second components include four sidewalls 32, 34, which are connected generally perpendicular to each other and extend from the peripheral portion. Base portions 36, 38 connect the side walls to form cavities 28, 30. However, it should be appreciated that only one of the first and second components 18, 20 may be configured with a cavity. For example, it is foreseeable that the one of the first or second components may comprise a substantially flat cover or base portion wherein the other component would substantially house the pipe portions and fixture.

As previously mentioned, the first or second components 18, 20 are configured to receive a fixture 14 attached to and projecting from the first pipe portion 12 and second pipe portion 12' extending from the fixture. Accordingly, the first or second components may include additional sidewalls or shapes adapted for receiving the projecting fixture or otherwise.

For example, as shown in the drawings, the first component 18 may be configured with four additional connected sidewalls 46 that extends from the first base portion 36 in a similar direction to that of sidewall 32 and includes an additional base portion 47 generally parallel to base portion 36. This results in the first component having an increased cavity volume. However, it should be appreciated that sidewalls and base portion may be configured to enclose the fixture without the use of addition sidewalls and base portion. For example, by extending side walls the first component may easily receive the fixture. It should be appreciated that other configurations are available.

It should be appreciated that other shape configurations of the shells 24, 26 are contemplated such as conical, semispherical, pyramid, other configuration as described herein, or otherwise. Similarly, other cavity configurations are also available.

Preferably, the first and second components 18, 20 include mating surfaces 40, 42 located on the outer peripheral portions. The mating surfaces are configured to matingly engage each other upon joining of the first and second component and form a joint. In a preferred embodiment, the resulting joint forms at least a partial seal between the pipe portion having a fixture attached thereto and the surrounding area outside of the enclosure.

Optionally, the first or second mating surfaces may be planar or non-planar. For example, it is contemplated that the first and second mating surfaces include one or more corresponding features adapted to matingly engage and improve sealing of the enclosure. Such features may include projections 206, grooves 205 or otherwise, which are adapted to matingly engage a corresponding feature (e.g. projection and groove) or component. Accordingly, different suitable joints may be formed such as butt joints, tongue and grove joints, lap joints or otherwise.

The width of the mating surfaces 40, 42 may be the same or greater than the thickness of the sidewalls forming the shells 24, 26. However, in a preferred embodiment, the width of the mating surfaces are greater than the thickness of the sidewalls for providing improved sealing of the enclosure.

The first and second components also include a pair of first recessed portions 44 formed along the peripheral portion adapted to encompass at least a portion of the pipe portion 12 entering and exiting the system 10. The pair of first recessed portion forms at least a portion of the enclosure cavity and forms at least a portion of a first opening 45 upon joining of the first and second components. Preferably, the first opening comprises a shape corresponding to the pipe portion extending therethough. Also, the recessed portions may be configured for assisting in the mounting of the enclosure to the pipe portion.

As with the first and second mating surfaces, the width of one or more of the first recessed portion 44 may also be greater than the thickness of shells 24, 26 or even greater than the width of the mating surfaces 32, 34. Accordingly, the first recessed portion may provide added support for mounting, sealing or otherwise, of the enclosure 16 to the pipe portion 12.

Figure 5A:
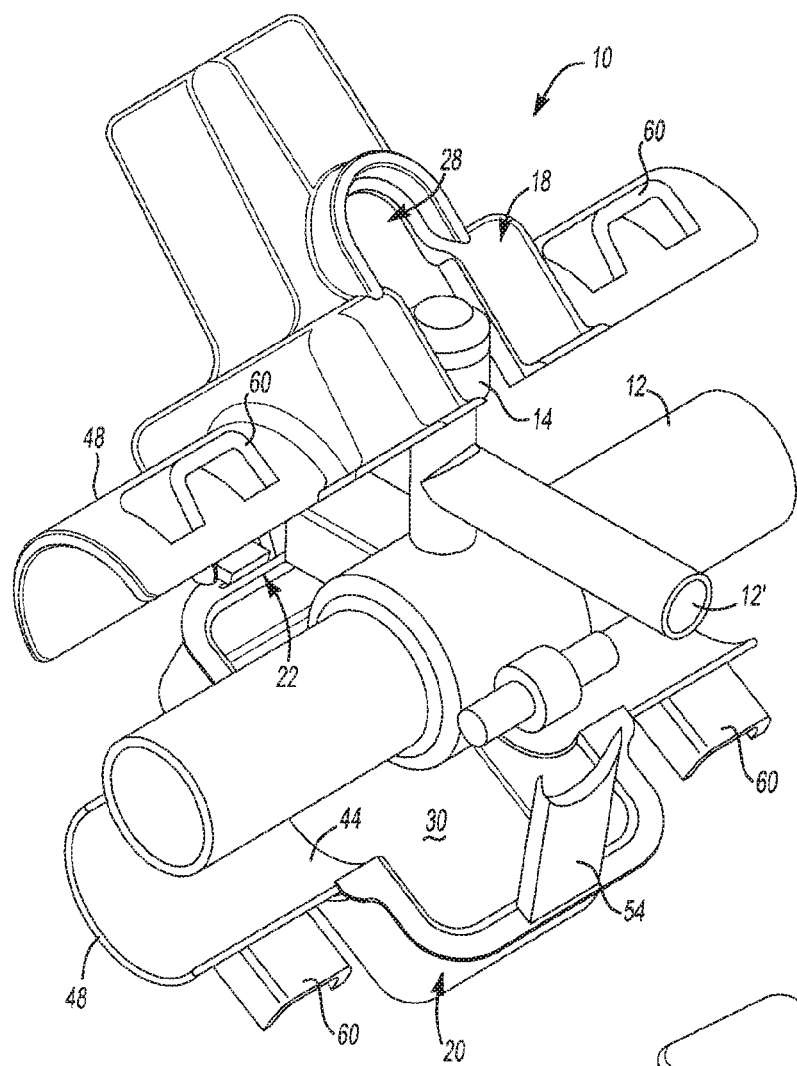
FIGS. 5a and b are perspective views of a third exemplary embodiment of the present invention.
Figure 5B:
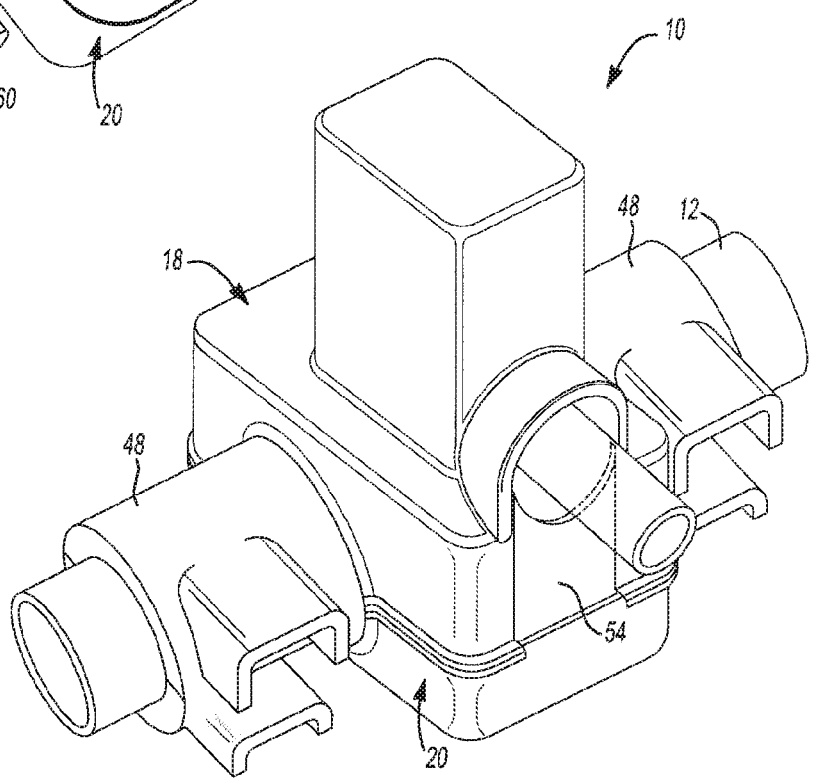

For example, with reference to FIGS. 5a-b the width of the recessed portion may be substantially greater than the width of the mating surfaces and shell. As shown, the first and second components may be configured with additional support members 48 extending from the formed recessed portions. Preferably these additional support members are integrally formed with the first and second components. Optionally, these additional components may provide a support structure for other features of the enclosure.

As previously mentioned, the enclosure may also be configured for receiving and providing an exit or entrance for a second pipe portion 12' extending from the fixture (e.g., valve assembly). Accordingly, the enclosure also contemplates the addition of one or more second recessed portions 50 for forming a portion of the enclosure cavity and forming a second opening 52. The second opening may correspond, at least in part, to the shape of the second pipe portion 12 extending therethough. The second recessed portion may be formed in the first, second or both components. However, in one preferred configuration, the recess portion is formed in the first component.

Referring again to FIG. 3, it is also contemplated that the enclosure of the present invention may be configured with one or more projections for assisting in supporting or sealing the second pipe portion. In the configuration shown, an extending member 54 is provided for filling at least a portion of the second recessed portions. The extending member may include an arcuate recessed portion for improving sealing of the enclosure. Accordingly, the combination of the arcuate recessed portion and second recessed portion, form an opening corresponding to the shape of the second pipe portion.

As previously mentioned, the first and second components 18, 20 are connected relative to one another, via an attachment feature. One preferred attachment feature comprises a suitable hinge 22. Suitable hinges that may be used with the present invention including living hinges, frictionless hinges, piano-type hinges, pin or pinless hinges, butt hinges, barrel hinge, concealed hinges, blum hinges, gate hinges, continuous hinges, piano hinges, spring hinges, hager hinges, weld on hinge, strap hinge, pivot hinges, amerock hinges, flat hinges, slip hinges or otherwise.

Figure 4:
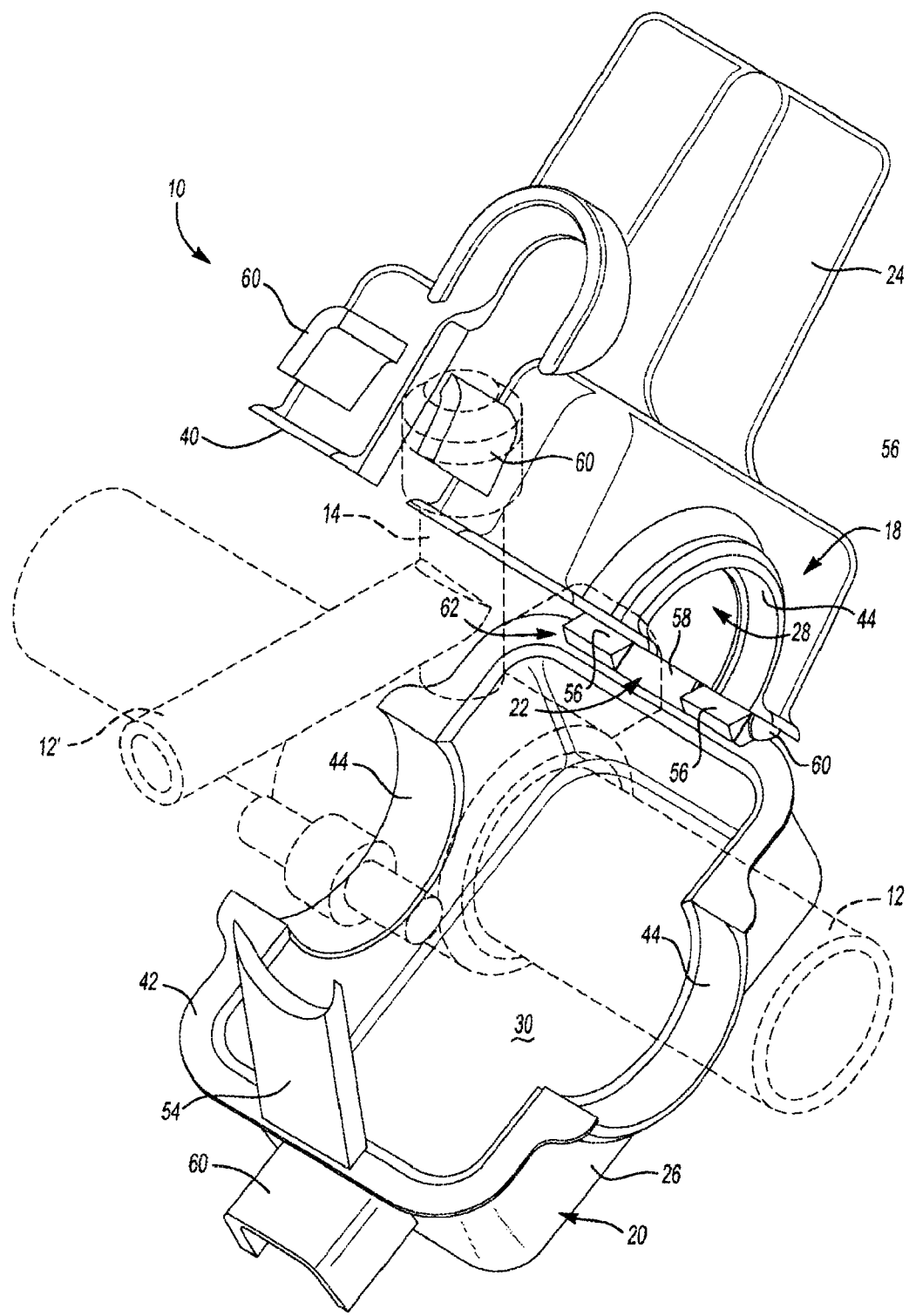
FIG. 4 is a perspective view of a second exemplary embodiment of the present invention in an open position prior to enclosure of a conduit and fixture.

Referring to FIG. 4, one exemplary hinge 22 of the present invention is shown. The hinge is configured with one or more first hinge portions 56 extending from the first component. The hinge also includes one or more second hinge portions 58 extending from the second component. The first and second hinge portions are adapted to receive a suitable pin 59, or are otherwise configured to matingly engaging each other to provide pivotal movement. Preferably, the first and second hinge portions are integrally formed with the first and second components 18, 20, respectively. As such, the hinge may comprise any of the component materials and manufactured using any of the enclosed techniques.

However, it should be appreciated that a separated hinge assembly may be utilized to pivotally mount the first and second components 18, 20, wherein the hinge 22 would be mounted to the first and second components using techniques known in the art hinge attachment (e.g., fasteners, adhesives, welding or otherwise).

The enclosure further contemplates additional features for assisting in the installation of the enclosure about a pipe portion and fixture. For example, one additional feature comprises one or more extending tabs 60, for providing engagement means for installation tools during installation of the enclosure 16. Additionally, the extending tabs may be configured for assisting in maintaining closure of the enclosure. For example, the extending tab may be configured for matingly engaging a faster or may comprise a portion of the fastener itself. Other advantageous features of the tabs should be appreciated.

Another example of an additional feature comprises an engagement feature for maintaining closure of the system. The engagement feature may be configured for temporary or permanent closure of the system. Accordingly, upon joining of the first and second components, the components may be substantially prevented from separating. Also, this feature may assist in creating a seal between the pipe portion, fixture and the area outside of the enclosure by maintaining the first and second mating surface proximate to one another.

In one example, the engagement feature comprises a snap-fit feature formed by the first and second components. Referring to FIG. 4, a snap-fit 62 configuration is shown. In this configuration, the snap fit is located at a rear portion of the enclosure 16. The snap fit comprises one or more tabs or projections (such as a portion of the first and second hinge portion or otherwise) attached or otherwise integrated with one of the first or second components adapted to engage the other of said first or second component. In the embodiment shown, engagement of the tab or projection occurs upon closure of the system, wherein the tabs abut the outer peripheral portion 28, 30 when the enclosure is in a closed position and substantially prevents the first and second components 18, 20 from pivoting with respect to one another.

It should be appreciated that other snap fit configurations are available which may be located in other locations of the enclosure, such as the front portion of the enclosure. For example, tabs 60 may be configured to form a snap-fit relationship upon closure of the system. Alternatively, tabs may be configured for receiving and/or forming a portion of a fastener for fastening the first and second components together.

In yet another example of an engaging feature, a suitable adhesive may be used to adhesively bond the first and second components together. Advantageously, the adhesive may be placed along at least a portion of the first, second or both mating surfaces. Suitable adhesive available include includes adhesive that are preferably water resistant or otherwise do not substantially degrade in the presence of water. Similarly, it is also contemplated that a sealing agent may be use in combination with the adhesive or the adhesive comprises sealing characteristics. As such, a sealing agent or adhesive may be use about the entirety of the first and second mating surfaces and the first and second recessed portions to substantially seal the enclosed pipe portion and fixture to create a seal from the surrounding area outside of the enclosure.

Referring to FIGS. 1-3, another additional feature of the present invention is shown. The additional feature comprises a suitable fluid nozzle 64 having opening for receiving a fluid agent 66 within the enclosure 16. The connector is configured to matingly link with a suitable delivery means 68 for the introduction of fluid agent 66 into the enclosure system 10. Accordingly, the suitable fluid nozzle includes an input fluid engagement feature for matingly engaging the fluid input device. This fluid engagement feature may comprise a snap-fit threaded engagement or otherwise. As discussed herein, preferably the agent includes characteristics which assisting in preventing corrosion to the pipe portion 12 and fixture 14 when applied.

With reference to the FIGS. 6-11b additional exemplary embodiments of the present invention are shown. Though separately described, it should be appreciated that the features shown or described in FIGS. 1-5b may be included in any of the embodiment shown or described in FIGS. 6-11b. Likewise, it should be appreciated that any of the features shown or described in FIGS. 6-11b may be included in the embodiments shown or described in FIGS. 1-5b.

Referring again to FIGS. 6-11b, the systems 110 are adapted to provide protection for a first pipe portion 112, a second pipe portion 112', and fixture 114 attached thereto. The system includes an enclosure 116 having a first component 118 and a second component 120. Advantageously, the first and second components are attached to provide motion relative to each other. Preferably, the first and second components are pivotally or hingedly attached via an attachment feature 122.

Generally, the first component 118 comprises a shell 124 having a cavity 126 adapted to house and provide protection to a pipe portion and fixture. The shell comprises an exterior surface and an interior surface, both of which end at an outer peripheral portion. The first component includes a first mating surface 130 located at the peripheral portion. The cavity of the first component is generally defined by the volume within the peripheral portion and extends to the interior surface of shell. The shell extends along a pipe portion 112 and first axis 128.

The first mating surface includes a first pair of first recessed portions 132 formed along the peripheral portion adapted to receive the first pipe portion 112. Preferably, the first recessed portions are adapted to envelop one half of the pipe portion and form at least a portion of a first opening 134. More preferably, the first recessed portions have a corresponding shape to the pipe portion. Accordingly, it is contemplated that the recess portion may be semi-circular about the first axis for receiving the pipe portion and forming a seal therewith.

The first opening 134 extends along first axis 128 and is adapted to receive the pipe portion 112 extending therethrough. In the embodiment illustrated, the first opening extends through the entire length of the enclosure 116 so as to allow a main supply line or otherwise to continue through the enclosure without interruption. However, it should be appreciated that the first opening may not extend the entire length of the enclosure, but instead extends only through one end of the enclosure. As such, it is contemplated that the enclosure may be used at the end of a main pipe portion wherein the main pipe portion no longer travels entirely through the enclosure. Other configurations are available.

With regards to shape, the shell 124 of the first component includes a first portion 136 and a second portion 138. In FIGS. 6-10b, the first and second portions comprise arcuate portions having a first and second radius, with respect to the first axis 128. The radius of the first portion may be larger than the radius of the second portion. This increase radius provides a larger volume within the region of the first radius portion to receive and/or house components extending from a pipe portion 112 (e.g., fixture 114 or otherwise).

However, the first and second radius may also be the same. Also, it should be appreciated that the first and second radius may not have a common origination point (e.g., located on the first axis) but instead are displace with respect to the first axis 128.

In the embodiments shown in FIGS. 6-10b, the shell 124 may further includes an intermediate portion 140 adapted to connect the first and second portions 136, 138 to form a continuous member. Preferably, the shell extends radially approximately 180° about the first axis 128, though other configurations are available.

Figure 11A:
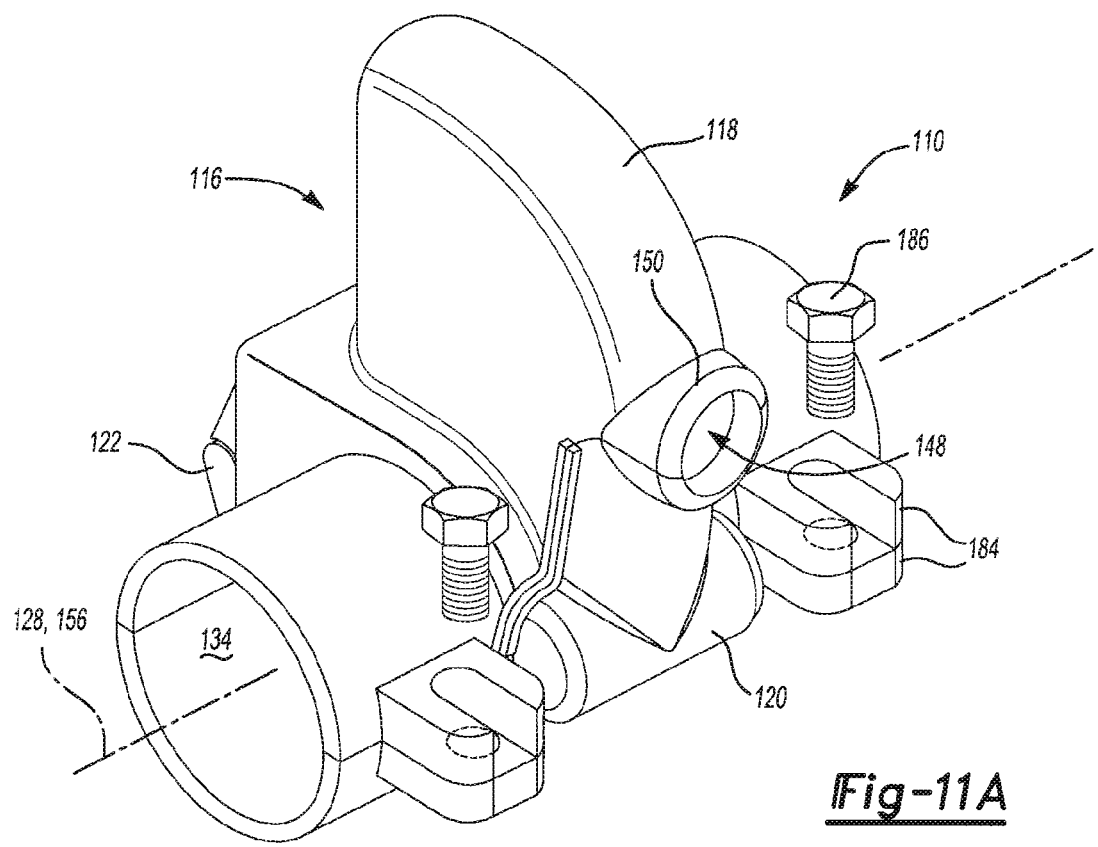
FIGS. 11a and b are perspective views of an ninth embodiment of the present invention.
Figure 11B:
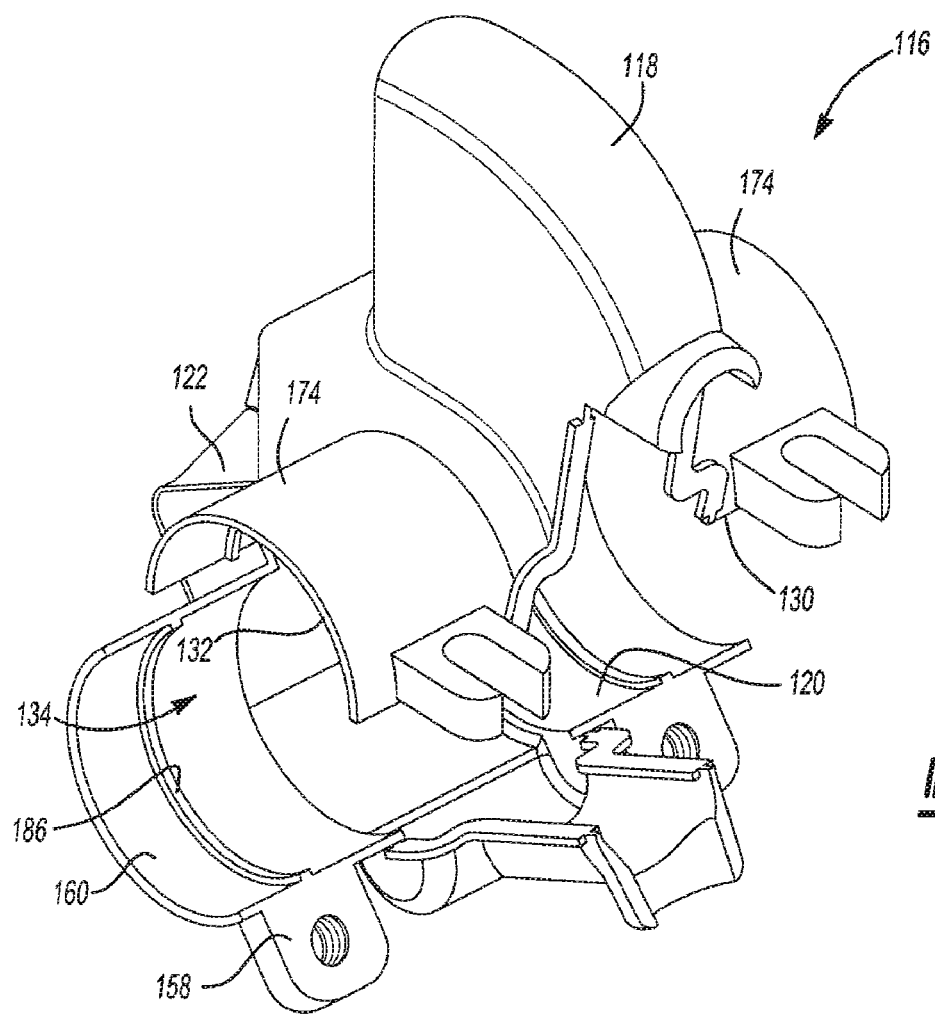

The first and second portions 136, 138 comprise a contoured cross-section along the width of the same. In the embodiments shown in FIGS. 6-8b, the contoured cross-section of the first and second portions comprises a substantially flat surface. Alternatively, as illustrated in the embodiments shown in FIGS. 9-10b, the contoured cross-section of the first and second portions may comprise a substantially arcuate or rounded surface. Furthermore, as illustrated in FIGS. 11a-b, the contoured cross-section of the first and second portion may comprise a combination of arcuate and rounded portions. It should be appreciated, that the contoured cross-section of the first and second portions may be similar or dissimilar.

The first shell 124 further includes sidewalls 142 extending from the first and second portions 136, 138 to the peripheral portion. The first and second portions may have separate sidewalls or share a single. The combination of the first and second portion 136, 138, the intermediate portion 140 and sidewalls 142 form all or part of the shell 124. Likewise, preferably, the combination of the first and second portion and joining sidewalls form the outer peripheral portion, which extends 360° around the shell.

Optionally, the first component 118 may further comprise of one or more support members 144 for assisting in securing the enclosure 116 to the first pipe portion 112, sealing the first component to the first pipe portion or otherwise. The support members are adapted to envelope one half of the first pipe portion 112 and form a portion of the first opening.

In the embodiments shown, the first component 118 is further configured with a second recessed portion 146 extending from the peripheral portion of shell 124. The second recessed portion extends into the first arcuate portion 136 and is adapted to form a portion of a second opening 148. The second recessed portion is suitable for receiving the second pipe portion 112' extending from fixture 114. It should be appreciated that second recessed portion may have all of the features and capabilities as discussed with first recessed portion 132.

Figure 6:
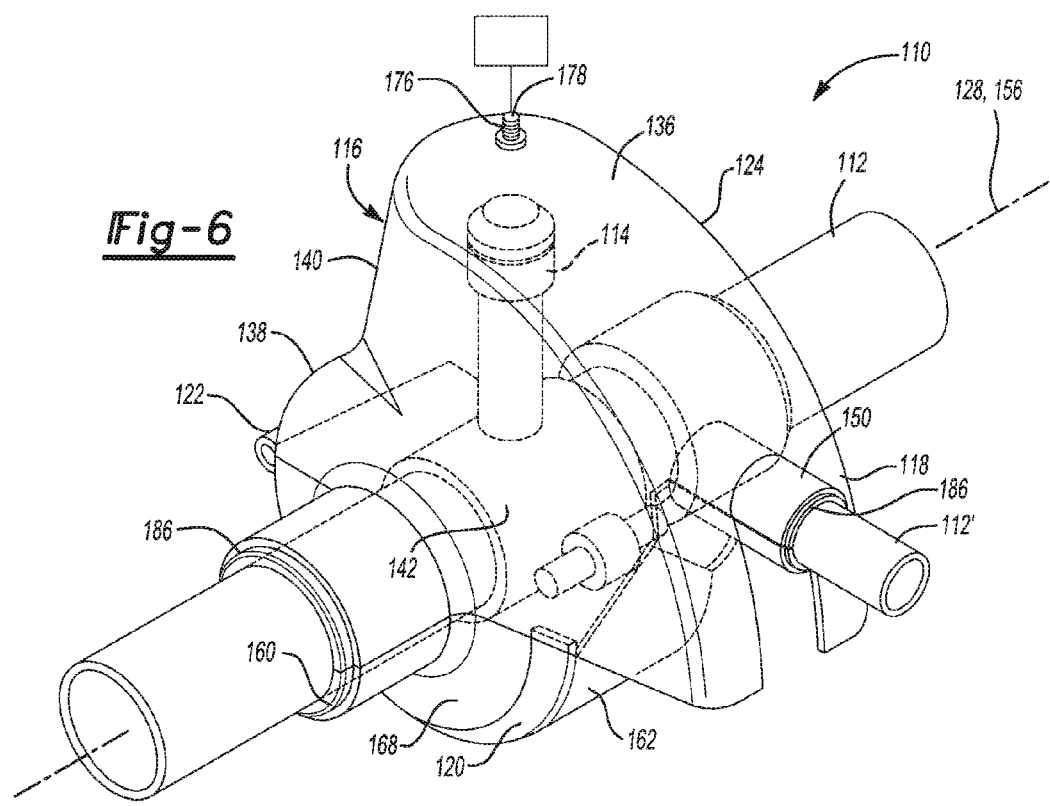
FIG. 6 is a perspective view of a fourth embodiment of the present invention enclosing a pipe portion and fixture.
Figure 7A:
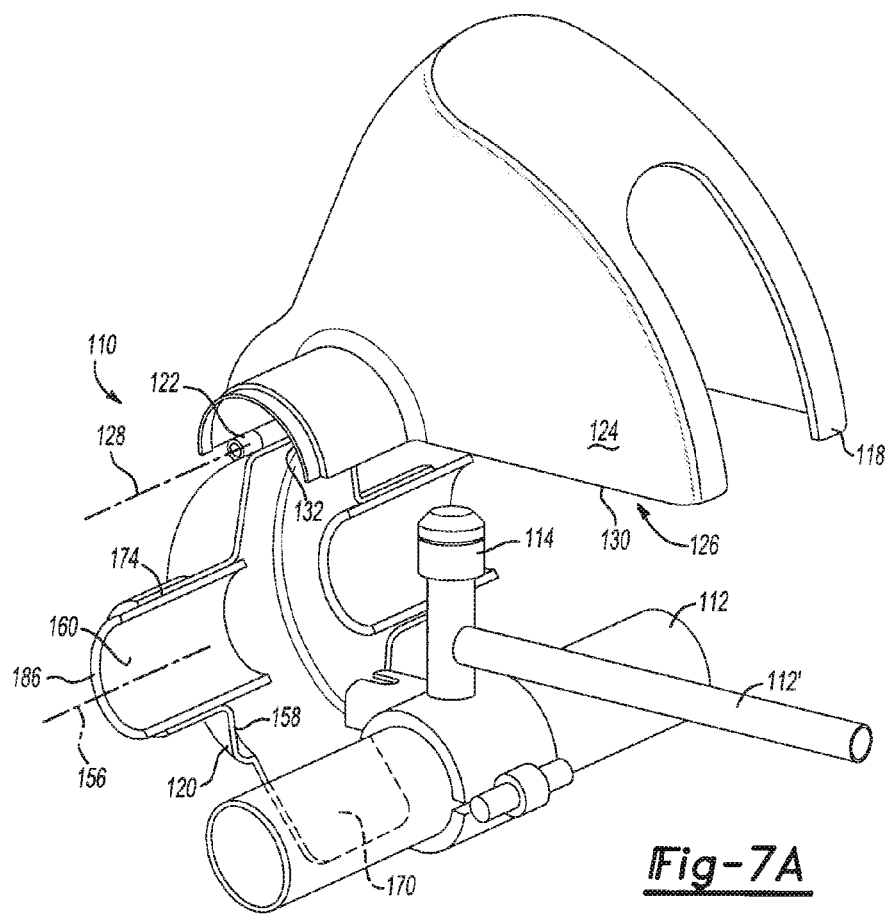
FIGS. 7a through c are perspective views of a fifth embodiment of the present invention in progressive stages of enclosing a pipe portion and fixture.
Figure 7B:
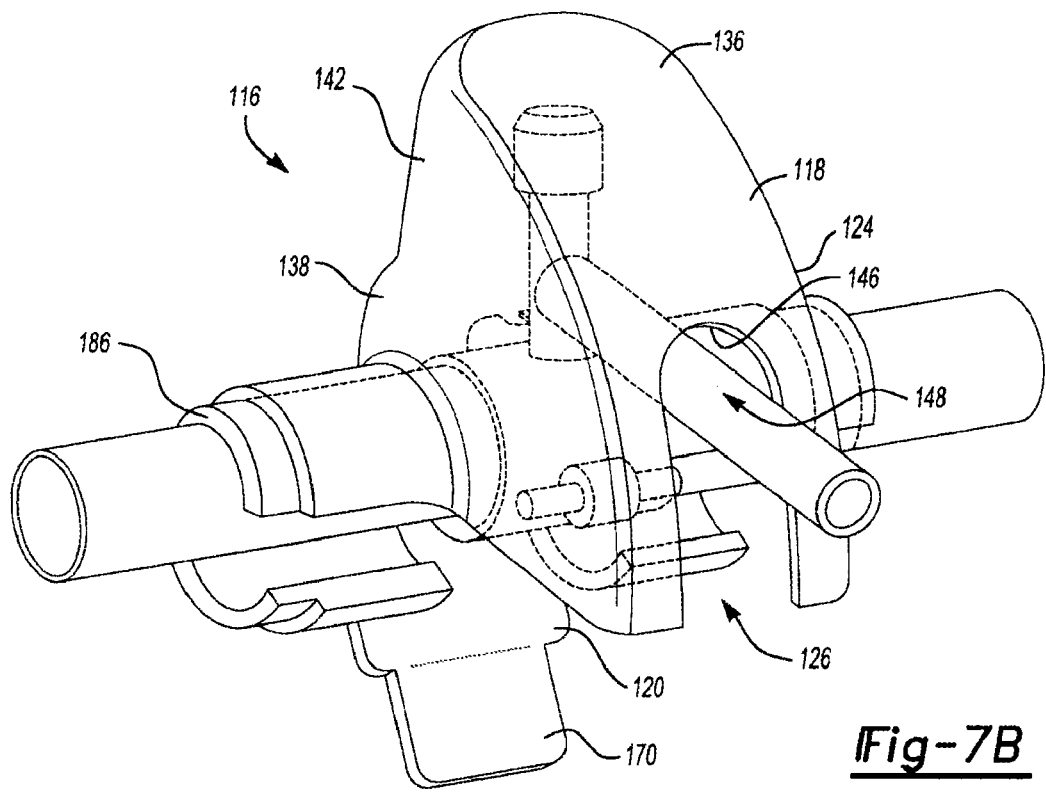
Figure 7:
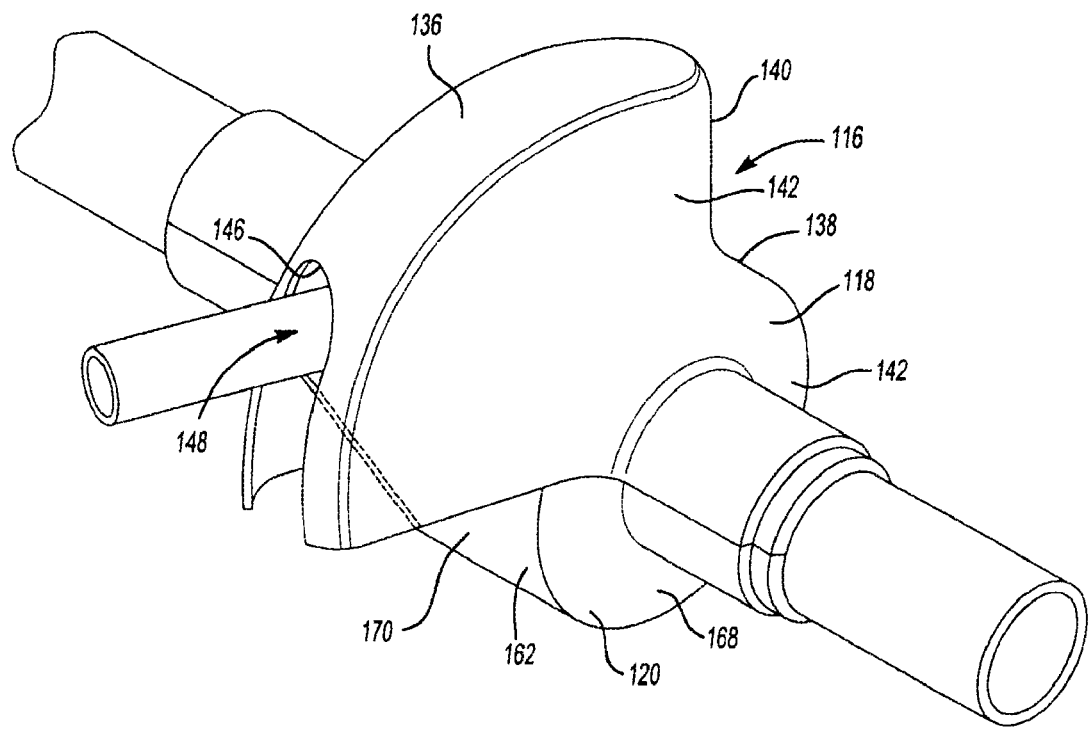
Figure 8A:
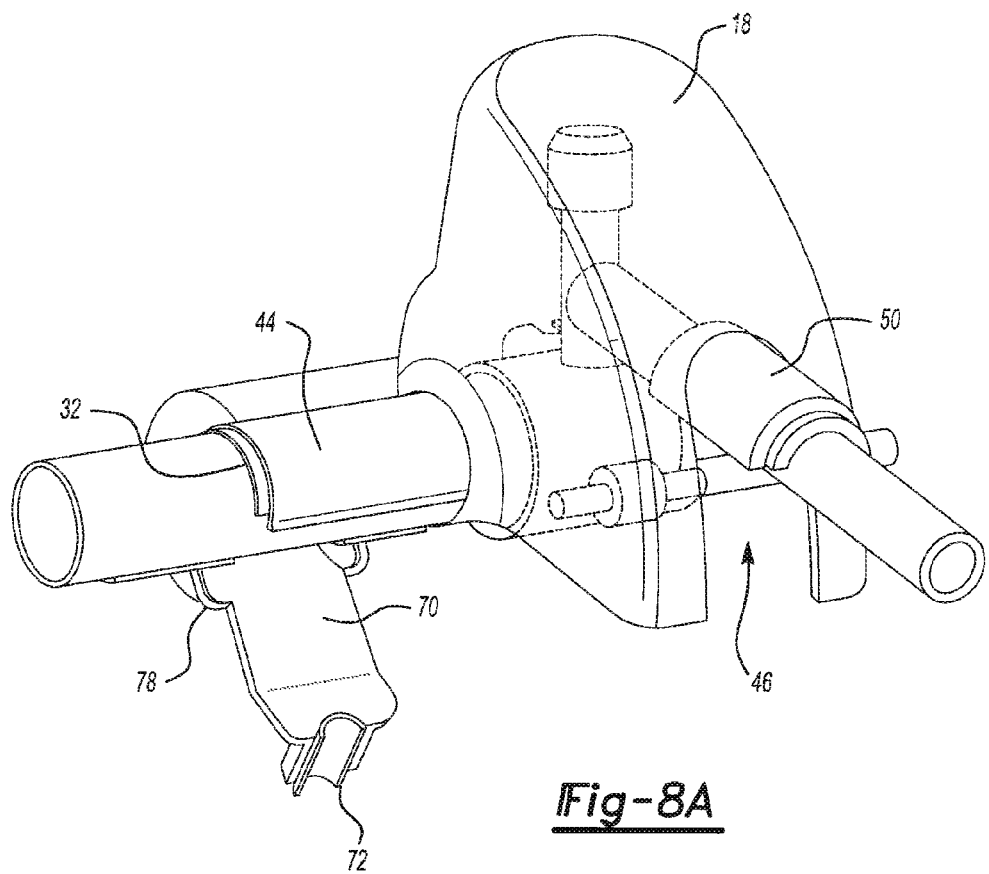
FIGS. 8a and b are perspective views of a sixth embodiment of the present invention in progressive stages of enclosure of a pipe portion and fixture.
Figure 8B:
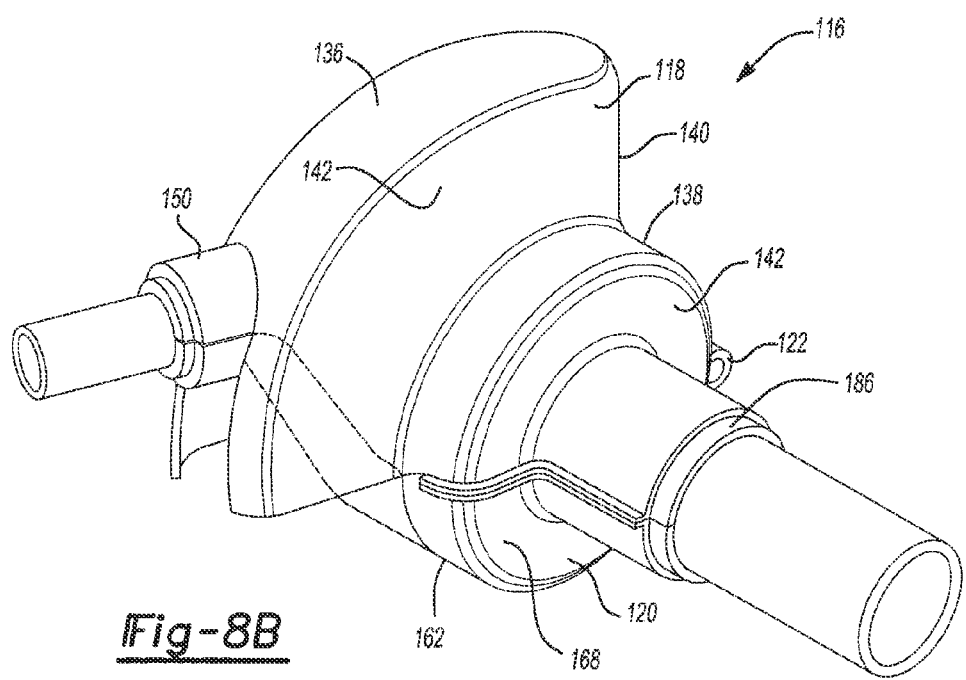

For example, as best seen in FIGS. 6, 7a-c, 9 and 10a-b, similar to the support members 144 extending from the shell 126, it is contemplated that additional support member 150 may extend from the shell and surround the second opening 148. Advantageously, this additional support member may provide sealing capabilities and/or additional mounting structure or otherwise. The additional support members 144, 150 formed about the first and second openings may also extend internal or external to the system 110, as shown in FIG. 6.

Turning now to the second component 120, the second component comprises a partial enclosure adapted to house the first pipe portion 112 and fixture 114 extending therefrom. Preferably, the second component is adapted to matingly engage the first component 118 to enclose the pipe portion and fixture. Preferably, upon joining of the first and second component a seal may be created with the first pipe portion. As previously mentioned, the alignment of the first and second component may be achieved through attachment feature 122, which preferably comprises a hinge.

The second component 120 includes a shell 152 having a cavity 154 adapted to house and provide protection for enclosed structures (e.g., one or more pipe portions 112 and valve assemblies 114). The shell comprises an exterior surface and an interior surface, both of which end at an outer peripheral portion. The cavity of the second component is generally defined by the volume within the peripheral portion and extends to the interior surface of shell. The shell 152 is adapted to extend along the first pipe portion 112 and a second axis 156.

The second component includes a second mating surface 158 located at the peripheral portion. It should be appreciated that the first and second mating surfaces 130, 158 are configured to matingly joining to form a joint. Accordingly, different joins may be formed as discussed herein. The peripheral portion of the shell include a pair of first recessed portions 160 adapted to receive the first pipe portion 112. Preferably, the recess portions are configured to envelop about one half of the first pipe portion. More preferably, the recessed portions are semi-circular about the second axis 156 and form a portion of the first opening 134. Accordingly, a seal may be created with the second component and the pipe portion.

It should be appreciated that the first opening 134 may be formed by the first and second recessed portions 132, 160 when the first and second mating surfaces 130, 158 are joined. As such, as shown in FIG. 6 the first and second axis's 130, 158 may substantially coexist when the first and second components 118, 120 joined together.

In the embodiments shown in FIG. 6, the shell 152 may comprise an arcuate portion 162 extending approximately 180° with respect to the second axis 158. However, as with the first component 118, other configurations of the second component 120 are available. For example, referring to FIGS. 9, 10a-b and 11a-b, the shell may comprise a combination of arcuate and linear portions 164, 166 joined to extend approximately 180° with respect to the second axis. Alternatively, the shell may comprise solely of one or more linear portions.

The second component 120 may comprise a contoured cross-section along the width of the same. In the embodiments shown, the contoured cross-section may comprise a substantially flat, rounded surface, combination thereof or otherwise. It should be appreciated, as demonstrated through the drawings, that the width of the arcuate portions and/or linear portion may be substantially consistent throughout the member 120.

The shell 152 is further configured with sidewalls 168 extending from the arcuate and/or linear portions 162, 164, 166 to the peripheral portion. The combination of the arcuate and/or linear portions and joining sidewalls 168 may form the outer peripheral portion, which extends 360° around the shell.

Optionally, second component 120 may further comprise an extending member 170 extending from the peripheral portion of shell 154. The extending member may be adapted to form a portion of the second opening 148. For example, as illustrated in the embodiments shown in FIGS. 8a-b, 9 and 10a-b, the extending member is configured with a recessed portion 172 adapted to form a portion of the second opening and envelope a portion of the second a pipe portion 112'.

Similar to the first component 118, it is also contemplated that support members 174 may extend from the shell 154 and surround a portion of the first and/or second openings 134, 148. Advantageously, these additional support members may provide sealing capabilities and additional mounting structure for mounting the second component to the pipe portion 112. It should be appreciated that the additional support members may extend internal or external to the system 110.

As previously mentioned, the first and second components 118, 120 are connected relative to one another via an attachment feature 122. Preferably the attachment feature comprises a hinge adapted to move the first and second components relative to one another. Suitable hinges that may be used with the present invention include the same hinges previously discussed in the embodiment shown in FIGS. 1-5.

As previously mentioned the first and second components 118, 120 are configured with mating surfaces 130, 158 along the peripheral portions and are adapted to join one another. Preferably, the first and second matting surfaces are aligned with one another when the enclosure 110 is in a closed position. It should be appreciated that the width of the mating surfaces may be greater than the thickness of the shell. Likewise, the width of the formed first and second recessed portion 132, 160 and 146, respectively, may also be greater than the thickness of the shell, the mating surface or both.

Figure 9:
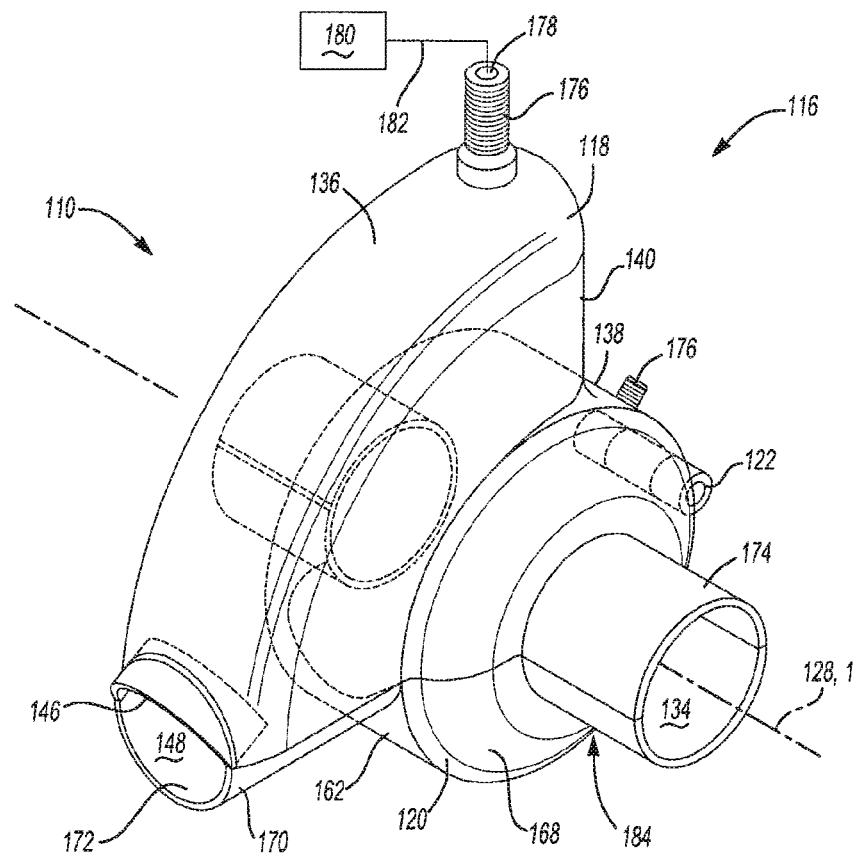
FIG. 9 is a perspective view of a seventh embodiment of the present invention.
Figure 10A:
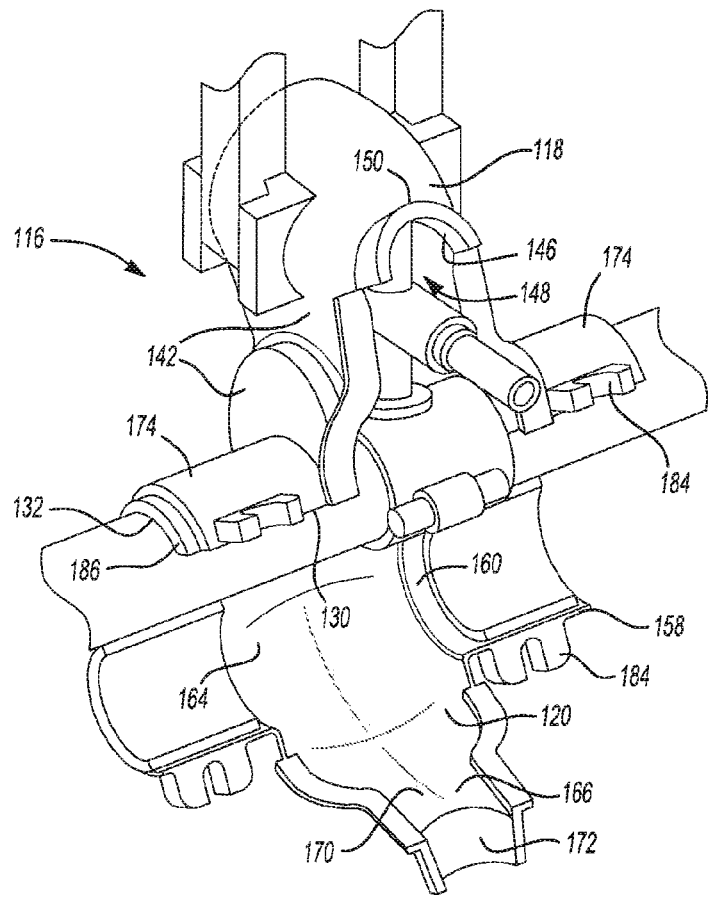
FIGS. 10a and b are perspective views of an eighth embodiment of the present invention in progressive stages of enclosing a pipe portion and fixture.
Figure 10B:
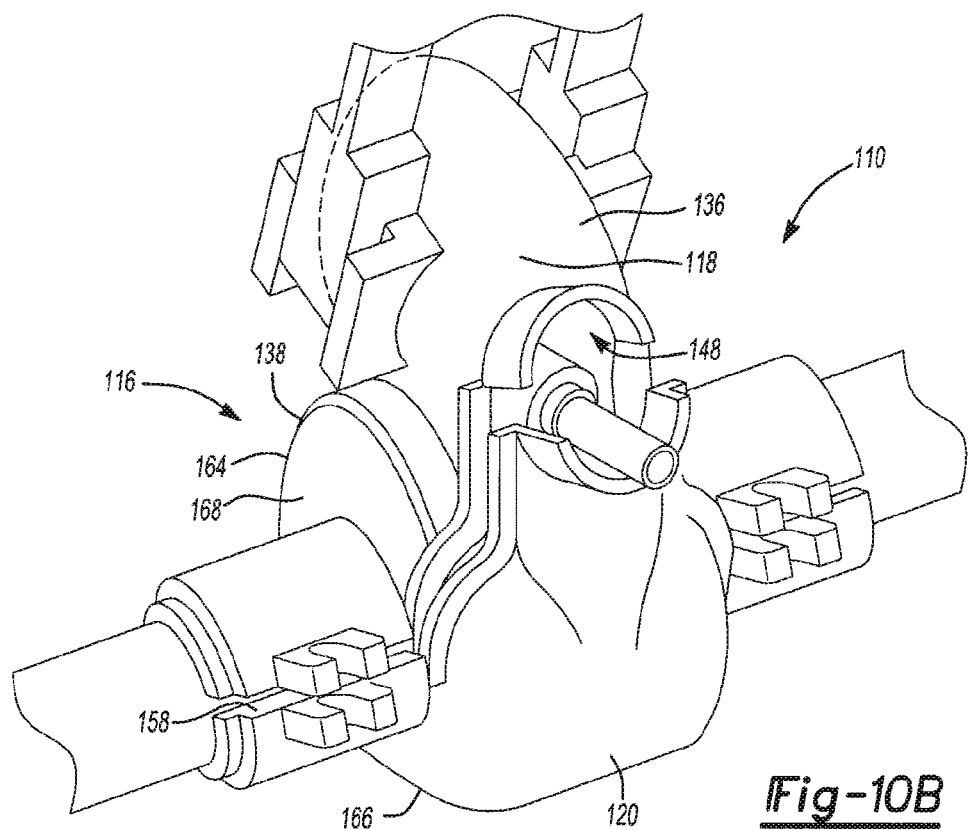

Referring to FIGS. 6 and 9, the present invention may further include one or more suitable fluid nozzles 176 having opening 178 adapted for providing a conduit for fluid agent 180 entering the system 110. Preferably, the connector is configured to matingly link with a suitable fluid delivery means 182. As previously mentioned, preferably the fluid agent comprises characteristics which assist in preventing corrosion to the pipe portion 112 and fixture 114. However, the fluid agent may have reinforcing characteristics as well.

Preferably, the material 180 entering the system 110 substantially fills the cavity between the enclosure 116 and the pipe portions 112 having a fixture 114 attached thereto. Preferably, the material adheres to the pipe portion and fixture and provides corrosion protection thereto.

Another feature of the present invention may include an engaging feature 184 used to prevent the enclosure 116 from opening from a closed position. The engagement feature may form a temporary or permanent locking configuration. As such, it is contemplated that the first and second components 118, 120 include corresponding engaging features.

Referring to FIG. 9, a first suitable engagement feature 184 is shown. The engagement feature comprises a snap-fit arrangement, wherein the first and second component 118, 120 include corresponding engaging features (e.g., a male and female feature) to form a suitable locking mechanism. A second suitable engagement feature 184 is illustrated in FIGS. 10a-b and 11a-b, which comprises features located on the first and second components adapted to matingly engage. For example, referring to FIGS. 11c and b the first or second component may be threaded to engage a corresponding fastener 185 configured to engage the other of said first or second component.

Still another example of a engagement feature comprises a suitable adhesive located between the first and second mating surfaces to bond the same together. Suitable adhesive available include adhesive that are water resistant upon curing. It should be appreciated that other suitable locking mechanisms are available.

Likewise, it is also contemplated that a sealing agent may be use in combination with the adhesive or the adhesive comprises sealing characteristics. As such, a sealing agent or adhesive may be use about the entirety of one or more of the first or second mating surfaces 130, 168 and recess portions 132, 146, 160, 172 to substantially seal the enclosed pipe portion 112, 112 and fixture 114 and create a substantial seal from the surrounding environment, which may be hermetic.

It is contemplated that the systems 10, 110 of the present invention may be adapted to provide at least a partial seal between the pipe portions, fixture and the surrounding environment. Accordingly, the enclosure may be further configured to prevent materials (e.g., water, dirt, rocks or otherwise) from entering the system. For example, the first and second recessed portions may be configured with sealing members adapted to form a seal between the enclosure and pipe portion. Such sealing members include gaskets, hydrophobic material, reinforcing material, adhesives, combinations thereof or otherwise.

For example, as shown in FIGS. 6, 7a-c, 8a-b and 10a-b, a sealing member, such as gasket 186, is shown. The sealing member is between the pipe portion and enclosure and is adapted to form a seal therebetween. Preferably, the sealing member is flexible to allow the member to conform to the shape of the pipe portion, enclosure, or both. Optionally, the sealing member may include an anti-corrosion agent, as described herein. Accordingly, the sealing member may comprise an open cell structure for receiving the agent. Suitably open cell structures include foam, fabric (such as felt or otherwise), porous material, or otherwise.

Alternatively, or in conjunction therewith, the first, second or both members may include an integrally formed sealing member. For example, as shown in FIG. 11B, the first and second component may include an integrally formed sealing member 188. The sealing member limits or prevents materials from entering the system through support members 144 174. Additionally, the sealing member may be configured to form a seal, as with gasket 186. As with gasket 186, the integrally formed sealing member may also be flexible to form to the shape of a pipe portion or otherwise.

The strength and rigidity of the enclosure may vary depending on the surrounding conditions. However, preferably the enclosure is configured to resist forces encountered in during underground utility applications (e.g., pressure due to applied layers of dirt placed there upon, jarring force due to excavating machines or hydro-forming tools, internal pressures originating from an enclosed pipe, erosion or movement of surrounding dirt or rock or otherwise). Accordingly, the enclosure may be rigid or semi-rigid to provide such benefits or otherwise. In a preferred embodiment, the enclosure is rigid and can resist the above-mentioned forces without failure or substantial deformation such that the integrity of the pipe portions and fixture are substantially not compromised.

Suitable materials contemplated for the present enclosure includes metals, plastics, rubber or otherwise. Preferred material includes materials that are substantially resistance to sparks, corrosion, combinations thereof or otherwise. Other preferred material includes a rigid material, which is both spark and corrosion resistant. One highly preferred material for the first and second components comprises a plastic which optionally may include reinforcing material, such as glass fibers or otherwise. It should be appreciated that the first and second components may comprise materials that are similar or dissimilar.

The first, second or both components may be manufactured using common forming techniques such as molding, casting, stamping or otherwise. One preferred method of manufacturing includes molding (such as blow molding, rotational molding, injection molding, or otherwise) of the first and second components.

Optionally, the enclosure may be configured with a marking or identification insignia (such as a color or otherwise), which assists in identification or discovery of the enclosure within a keyhole or otherwise. Marking or identification insignia may be formed with the components of the enclosure or maybe subsequently attached thereto. Accordingly, this would provide a means for distinguishing the enclosure from the surrounding environment. Furthermore, this will help prevent damage to the enclosure, pipe portions and valve located therein during excavating. Preferably the color of the enclosure is distinguishable from the surrounding environment. Preferred colors of the present enclosure include bright or florescent colors. Examples of such colors include: yellow, green, blue, orange, red, white, black, combinations thereof or otherwise.

Also, it is contemplated that one or more additional layers may be applied to the enclosure (e.g., the first, second or both components) to enhance the performance of the enclosure. Such additional layers may include spark resistance materials, anticorrosion materials, adhesives, reinforcing materials, pigmentation or otherwise. It should be appreciated that the additional layer may include or comprise an identifying color as described herein.

The fluid agent entering the system preferably substantially fills the cavity between the enclosure and the pipe portions and fixture. Preferably, the material adheres to the pipe portion and fixture and provides corrosion protection. Alternatively, or in conjunction therewith, the enclosure may include a wrap which may include a layer of the fluid agent for wrapping the pipe portion and fixture.

Suitable materials that may be used to coat and protect the pipe portions and fixture include hydrophobic materials.

Preferably, the material is adapted to displace water or otherwise coat a pipe portion and fixture and repel water and moisture therefrom. One preferred material has a material viscosity configured to adhere to the pipe portion and fixture but is still flowable so as to allow the material to fill the cavity, such that the cavity is substantially free of voids. Optionally, the material is pourable material at a first temperature and substantially solidifies at a second lower-temperature.

One suitable material may comprise or otherwise include wax. Another suitable material includes petroleum or a petroleum byproduct. Still another suitable material includes both wax and a petroleum product. Suitable petroleum products include oils, grease, other lubrication type products or otherwise. More specific examples of suitable material include petroleum, wax-based product sold by Trenton Corporation of Ann Arbor, Mich. under the trade names Graycoat, Temcoat and Fill Coat No. 6. However, a most preferred agent may comprise petroleum, wax-based product sold by Trenton Corporation of Ann Arbor, Mich. under the trade name Wax-Tape Primer. The Wax-Tape Primer advantageously adheres to pipe portions and fixtures but still remains pourable or is otherwise capable of filling the cavity leaving the cavity substantially free of voids or air pockets between the pipe portions with attached fixture and the enclosure.

Other examples of a suitable material 66 and delivery methods thereof which may be used in conjunction with the present invention can be found in commonly owned U.S. Pat. No. 4,469,469 herein incorporated by reference.

Alternatively or in conjunction therewith, prior to enclosure the pipe portion and fixture may be wrapped with a material having protective coating. Preferably, the wrapping material comprises a water resistant material and more preferably is configured to prevent water or moisture from contacting the pipe portions or valve assembly. It should be appreciated that the wrapping material may include a petroleum product and/or wax or any of the suitable materials discussed herein.

Examples of suitable wrapping material that may be used in conjunction with the present invention can be found in commonly owned U.S. Pat. Nos. 5,540,985, 3,625,259 and 3,525,656 herein incorporated by reference.

The present invention also contemplates a method of protecting underground pipes from the surrounding environment as discussed herein. The method may be advantageously when used within a keyhole used for accessing underground natural gas pipe portions or otherwise. It should be appreciated that the method discussed herein may be used with any of the embodiments disclosed herein.

Referring to the enclosed embodiments, in general, the method may include one or more of the following steps. At the onset, the method includes forming a keyhole within the ground for accessing a first pipe portion having a valve attached thereto and a second pipe portion extending from the valve. Preferably, the keyhole is vertically formed and is sufficiently shaped to expose the under-portion of the first pipe portion.

Upon formation of a keyhole, the enclosure of the present invention is lowered into the keyhole proximate to the valve portion and fixture. Preferably, the enclosure is open prior to placement within the keyhole.

Advantageously, tools may be used to lower the enclosure into the keyhole and close the enclosure about the pipe portion and fixture. A first keyhole tool comprises a clasping member 200, which is most suitably use in lowering the enclosure to a position proximate to the pipe portions and fixture. Advantageously, the clasping member is adapted to releasably grip the first component and is suitable in length to allow lowering of the enclosure to the pipe portion and fixture located towards the bottom of a formed keyhole.

Another keyhole tool comprises a lifting member configured for closing the enclosure about the pipe portions and fixture. The lifting member functions by engaging tabs, engaging feature, or otherwise, of the second component and bringing it proximate to the first component.

Upon joining of the first and second component, the first and second features may be lockably engaged using suitable engaging features as described herein. This may include engaging the first and second component through a snap fit configuration, fastening the first and second component using a fastening system, or otherwise. Optionally, upon closing and engagement of the first and second component, at least a partial or complete seal is created between the pipe portions, valve assembly and the surrounding area outside of the enclosure.

Preferably upon closure around the pipe portions and fixture a gap exists between the enclosure and the pipe portions and attached fixture. As such, it is contemplated that a suitable material (as described herein) may be place around the pipe portion and fixture to protect the pipe from damage (e.g., corrosion or otherwise).

In view of this gap relationship, the method may further include the step of protecting the pipe portions and fixture, using any of the wraps or anti-corrosion agents contained herein. Advantageously special tools may be used to wrap the protective coat around the pipe portions and fixture since it is typically located within a keyhole and out of the reach of an individual. As such, this additional step typically is preformed prior to the enclosure being lowered into the keyhole.

Alternatively, or in conjunction therewith, the method may further comprise the step of inserting a material within the enclosure, via a fluid connector, to further protect the pipe portions and fixture. As previously discussed, the material is preferably a pumpable material that possesses anti-corrosion characteristics or is otherwise adapted to protect the pipe portions and fixture from corrosion. Either before or after lowering the enclosure into the keyhole the connector is matingly link with a suitable delivery means for the introduction of material into the enclosure. Once the enclosure is in the closed position the suitable material is pumped or otherwise placed into the system. Optionally, upon completion, a substantial majority of the pipe portion and fixture within the enclosure is hermetically sealed from the surrounding environment.

Still further, yet another step may comprise alternatively placing the suitable material within the enclosure prior to placement of the enclosure within a keyhole. Accordingly, as the enclosure is mounted to or otherwise closed about the pipe portion and fixture the suitable material located within the first, second or both components substantially coats the same. It should be appreciated that other steps may further be employed as described or shown herein.

In view of the foregoing discussion, the present invention provides a system and method for providing a rigid protective enclosure for protecting one or more enclosed pipe portions and fixture from surrounding applied forces. In addition, the present invention further provides a enclosure adapted to sealaby enclosing one or more pipe portions and fixture from the surrounding environment, particularly moisture and other potentially corrosive fluids. Most advantageously, the present invention provides these benefits while being suitably designed to fit within spatially restricted areas, as typically encountered within a keyhole.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only nine of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The invention claimed is:

1. An enclosure system for conduit and fixture attached thereto, the system comprising:
    a first component having a first mating surface;
    a second component having a second mating surface;
    an attachment feature for hingedly attaching the first and second components and guiding the enclosure to move between an open and closed position, said attachment feature comprising a first and a second portion, wherein the first portion is integrally formed with the first component and the second portion is integrally formed with the second component;
    an engagement feature for maintaining closure of the enclosure having a first portion and a second portion, wherein the first portion is integrally formed with the first component and the second portion is integrally formed with the second component;
    wherein upon closure a cavity is formed between the first and second components which includes a first opening and a second opening for receiving a first conduit, and a third opening for receiving a second conduit, the first conduit extending through the enclosure and said first conduit having a fixture attached thereto, further wherein at least a portion of the first opening is at least partially formed by the first and second components, at least a portion of the second opening is at least partially formed by the first and second components, at least a portion of the third opening is at least partially formed by the first and second components, and further wherein upon closure the first mating surface and the second mating surface engage each other forming at least a partial seal between the first conduit having a fixture attached thereto.

2. The system of claim 1, further comprising an anti-corrosion agent located within the cavity between the first conduit having a fixture attached thereto and an interior surface of the first and second component.

3. The system of claim 2, wherein the anti-corrosion agent substantially fills the cavity between an interior portion of the first and second components and the first conduit having a fixture attached thereto.

4. The system of claim 2, further comprising a fluid nozzle having an engagement feature for matingly engaging a fluid delivery device, the fluid nozzle being adapted for receiving the anti-corrosion agent.

5. The system of claim 2, wherein the anti-corrosion agent includes petroleum, wax or a combination thereof.

6. The system of claim 2, wherein the anti-corrosion agent is wrapped about the first conduit and fixture attached thereto.

7. The system of claim 1, wherein the engagement feature comprises a snap-fit feature integrally formed with the first and second components.

8. The system of claim 1, wherein upon closing of the enclosure the engagement feature mechanically acts substantially preventing opening of the enclosure.

9. The system of claim 1 wherein the first and second components includes a pair of first recessed portions for forming a portion of the first and second openings.

10. The system of claim 9, further comprising sealing members located between the pair of first recessed portions and the first conduit extending therethrough.

11. The system of claim 9, wherein the first component includes a second recessed portion for forming a portion of the third opening.

12. The system of claim 11, wherein the first conduit comprises a first pipe portion and the second conduit comprises a second pipe portion and the fixture comprises a valve for allowing fluid to flow from the first pipe portion to the second pipe portion.

13. The system of claim 1, wherein upon closing of the enclosure a seal is created between the first conduit having the fixture attached thereto and the area surrounding the enclosure.

14. An enclosure system for pipe portions having valves attached thereto, the system comprising:
    a first shell component having a cavity formed in a central portion and a first mating surface formed about a peripheral portion, the first mating surface including a first recessed portion for forming at least a portion of a first opening, a second recessed portion for forming at least a portion of a second opening, and a third recessed portion for forming at least a portion of a third opening;
    a second shell component having a cavity formed in a central portion and a second mating surface formed about a peripheral portion, the second mating surface including a first recessed portion for forming at least a portion of the first opening, a second recessed portion for forming at least a portion of the second opening, and a third portion for forming at least a portion of the third opening;
    a hinge at least partially integrally formed with the first and second components, the hinge providing rotational movement of the first and second components for joining the first and second mating surfaces and providing opening and closing of the enclosure; and
    a locking device at least partially integrally formed with the first and second components, wherein upon closing of the enclosure the locking device substantially prevents opening of the enclosure,
    wherein upon closing of the enclosure an enclosure cavity is formed between the first and second components for receiving a first pipe portion within the first and second openings and a second pipe portion within the third opening, and wherein a valve joining the first and second pipe portions is substantially housed in the cavity of the first component, and
    wherein the first or second shell components include a fluid nozzle for receiving an anti-corrosion agent.

15. An enclosure system for pipe portions having valves attached thereto, the system comprising:
    a first component having a cavity formed in a central portion and a first mating surface formed about a peripheral portion of the first component, the first mating surface including first recessed portion for forming at least a portion of a first opening, a second recessed portion for forming at least a portion of a second opening, and a third recessed portion for forming at least a portion of a third opening;

a second component having a cavity formed in a central portion and a second mating surface formed about a peripheral portion of the second component, the second mating surface including a first recessed portion for forming at least a portion of the first opening, a second recessed portion for forming at least a portion of the second opening, and a third portion for forming at least a portion of the third opening;

an attachment feature comprising a first and a second portion, wherein the first portion is integrally formed with the first component and the second portion is integrally formed with the second component, for hingedly attaching the first and second components and guiding the enclosure to move between an open and closed position;

an engagement feature comprising a first portion and a second portion, wherein the first portion is integrally formed with the first component and the second portion is integrally formed with the second component; and wherein upon closing of the enclosure an enclosure cavity is formed between the first and second components for receiving a first pipe portion within the first and second openings, and a second pipe portion within the third opening.

16. The system of claim 15, wherein the first or second components include a fluid nozzle for receiving an anti-corrosion agent.

17. The system of claim 15, wherein upon closing of the enclosure the engagement feature mechanically acts substantially preventing opening of the enclosure.

* * * * *